United States Patent [19]

Olson

[11] Patent Number: 4,759,781
[45] Date of Patent: Jul. 26, 1988

[54] FILTERING AND DUST COLLECTING APPARATUS

[76] Inventor: Robert P. Olson, 8080 Timber Lake Dr., Eden Prairie, Minn. 55344

[21] Appl. No.: 23,712

[22] Filed: Mar. 9, 1987

[51] Int. Cl.$^4$ .............................................. B01D 46/02
[52] U.S. Cl. ........................................ 55/273; 55/284; 55/302; 137/614.11; 210/138
[58] Field of Search ................ 55/271, 273, 284, 287, 55/302, 379, 429, 162, 163, 20, 21; 137/614.11, 614.13; 210/138

[56] References Cited

U.S. PATENT DOCUMENTS

| | | | |
|---|---|---|---|
| 2,561,441 | 7/1951 | Lou | 55/163 |
| 2,880,819 | 4/1959 | King et al. | 55/273 X |
| 3,097,936 | 7/1963 | Lincoln | 55/273 |
| 3,325,979 | 6/1967 | Smith | 55/302 |
| 3,373,545 | 3/1968 | Christianson | 55/273 |
| 3,396,516 | 8/1968 | Ballard | 55/302 |
| 3,401,505 | 9/1968 | Ballard | 55/341 |
| 3,485,671 | 12/1969 | Stephens | 55/429 X |
| 3,713,538 | 1/1973 | Kass | 210/138 |
| 3,853,508 | 12/1974 | Gordon | 55/302 |
| 3,884,659 | 5/1975 | Ray | 55/379 |
| 3,897,228 | 7/1975 | Berz | 55/273 |
| 4,077,781 | 3/1978 | Sundstrom | 55/96 |
| 4,208,884 | 6/1980 | Popham | 137/614.11 X |
| 4,292,053 | 9/1981 | Remillieux | 55/287 X |
| 4,293,111 | 10/1981 | Henri | 248/95 |
| 4,306,893 | 12/1981 | Fernando | 46/4 |
| 4,306,896 | 12/1981 | O'Dell | 55/341 |
| 4,336,035 | 6/1982 | Evenstad | 55/97 |
| 4,343,632 | 8/1982 | Margraf | 55/341 |
| 4,356,010 | 10/1982 | Meyer zu Riemsloh | 55/302 |
| 4,493,342 | 1/1985 | Bachmann | 137/614.11 X |

FOREIGN PATENT DOCUMENTS 0912043  5/1954  Fed. Rep. of Germany ........ 55/284

*Primary Examiner*—Charles Hart
*Attorney, Agent, or Firm*—Leo Gregory

[57] ABSTRACT

A dust collecting and filtering apparatus in connection with a particulate material processing apparatus to clean the dust laden air discharged by the grinding process of the apparatus consisting of a plurality of dust collectors in an independent operating arrangement, each collector having a tubular filter bag and having an inlet valve at the upper end thereof and having a discharge chamber having steeply sloped walls at the lower end of each filter bag and having an exhaust valve at the bottom thereof, an automatic timing arrangement operating the inlet and exhaust valves sequentially and a suction line in communication with said exhaust valves evacuating the dust collected in each dust collector.

4 Claims, 4 Drawing Sheets

FILTERING AND DUST COLLECTING APPARATUS

BACKGROUND OF THE INVENTION

1. Field of the Invention

This invention relates to a dust collection and air cleaning arrangement of apparatus in connection with a particulate material processing apparatus.

2. Description of the Previous Art

Air cleaning devices and dust collectors in connection with particulate material processing apparatus and including grinding mills make up an active art. Wire frame or cage like dust collectors are known to be in use as disclosed in U.S. Pat. No. 4,306,893 to Fernando et al. Various means are utilized to clean out the dust collecting receptacles.

It is known that shaking arrangements and sound waves are used and that pressurized air is blown up into filter members to loosen and discharge the accumulated dust.

It is desirable to have a more effective means for cleaning out filter members and particularly for respectively cleaning out a plurality of dust collecting members automatically on a timed cyclical basis.

SUMMARY OF THE INVENTION

It is an object of this invention to provide an air cleaning and dust collecting arrangement embodying a timed cyclical operated means for cleaning out the dust collecting members.

It is a further object of this invention to provide a dust collector having a filter bag, the collector having a chamber below the bag, the chamber having steeply angled walls, an exhaust valve at the bottom of said chamber and a suction line to effectively evacuate the dust collector.

Further it is an object of this invention to have a plurality of valve control members automatically operating the inlet and outlet valve of each dust collection and filter member to sequentially evacuate accumulated dust therefrom.

These and other objects and advantages of the invention will be set forth in the following description made in connection with the accompanying drawings in which like reference characters refer to similar parts throughout the several views.

DESCRIPTION OF A PREFERRED EMBODIMENT

Figure 1:
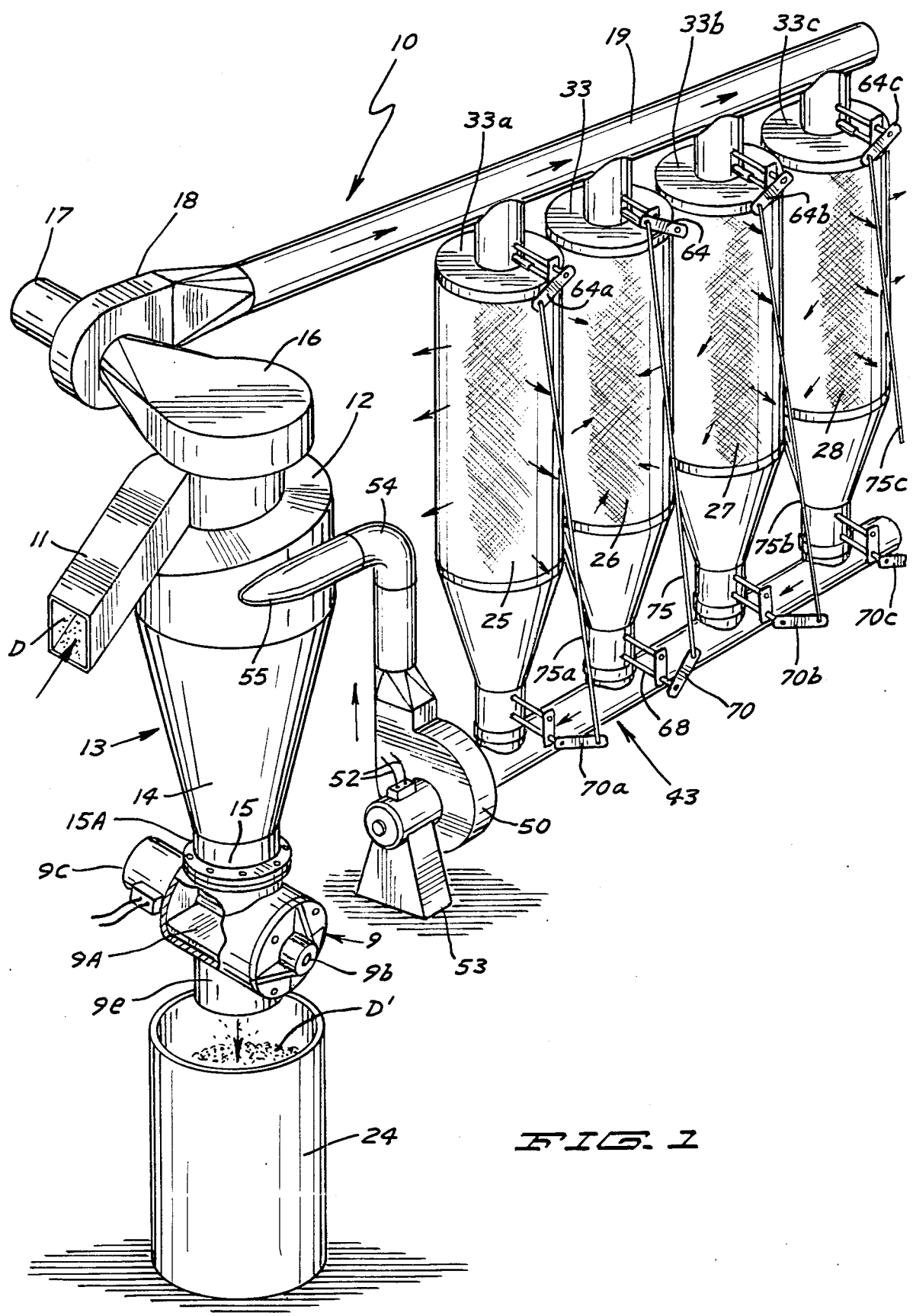
FIG. 1 is a view in perspective showing a dust collection and filter apparatus to be used in connection with a grinding mill.
Figure 2:
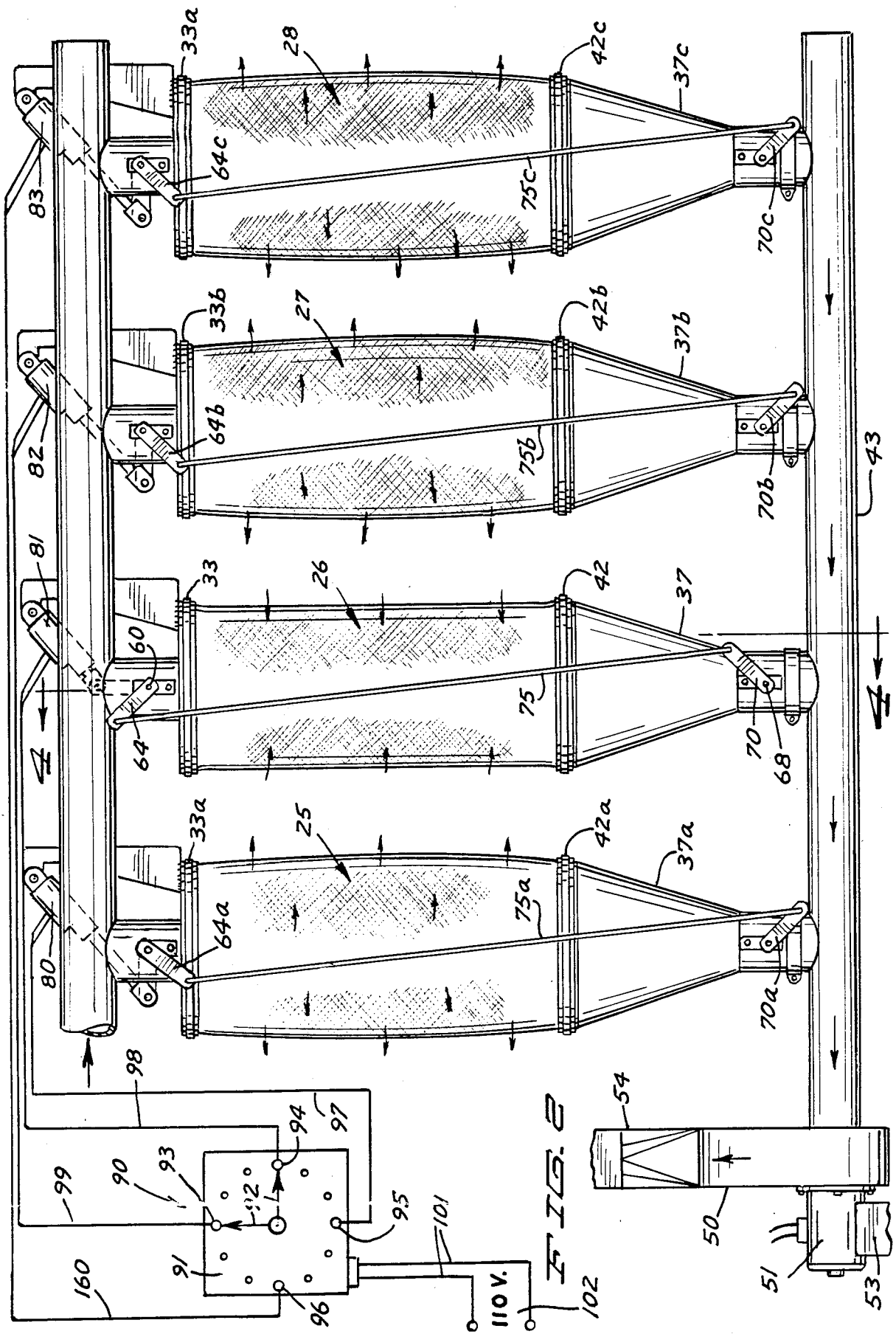
FIG. 2 is a view in front elevation showing some parts broken away and a portion thereof schematically.
Figure 3:
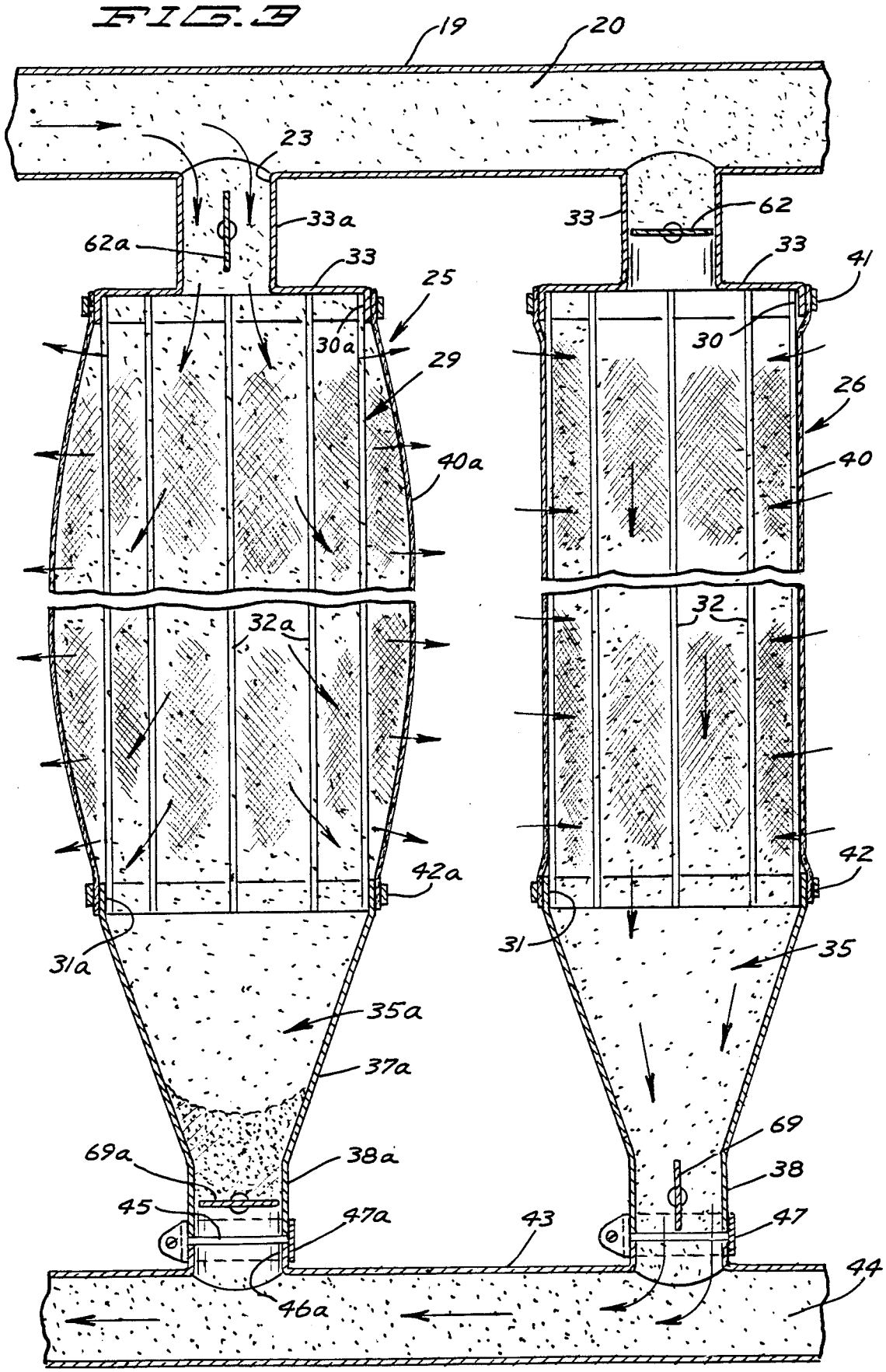
FIG. 3 is a broken view in vertical section.

Referring to the drawings, shown is the air cleaning dust collecting arrangement of the invention herein which is referred to generally by the reference numeral 10. In operation, the structure shown will be connected with a particulate material processing apparatus not here shown and the connection will be as by means of an extension of the inlet conduit 11 which will receive all of the dust laden air discharged in the grinding process of the apparatus. The word dust as used herein means all of the waste particles and refuse material discharged in the grinding process.

The conduit 11 feeds through a helical extension 12 of itself into a cyclone chamber 13 which is shown here formed having a substantially conically shaped body 14 having a depending cyclindrical exhaust conduit 15 which discharges the larger or heavier contaminants Dl which make up the composition of the dust. Said dust is indicated at D and in the grinding process is discharged or thrust into said conduit 11 with considerable force. The blower 16 mounted atop said cyclone chamber 13 increases the centrifugal action with which said dust enters said cyclone chamber. Said blower 16 is driven by a motor 17 which will be connected to a suitable power source.

Said blower connects to an exhaust manifold 18 from which extends a header conduit 19 which leads to each of the filter and dust collecting members as will be described. Said conduit has a passage 20 therethrough.

Referring back to said exhaust conduit 15, discharged therefrom are the heavier dust particles or contaminants Dl which fall by gravity and for purpose of illustration are shown being discharged into a receptacle 24.

Adjacent the bottom of said discharge conduit 15 is a rotary air lock 9 here shown having a cyclindrical body 9a, a bladed shaft 9b therein and having an attached motor 9c which will be connected with a suitable power source not shown.

Said body 9a has a top opening 9d which mates with a bottom flange 15a of said conduit 15. Said body 9a has a bottom opening 9e which discharges into said receptacle 24. Said receptacle may be suspended from said air lock 9 or be self standing as shown.

Said air lock has passing through then the heavier particles separated by gravity from the remainder of the dust laden air passing into and through the conduit 19. The bladed shaft 9b is rotated slowly by said motor 9c to pass particles dropping therethrough and to prevent the blower 16 from withdrawing particles from said receptacle 24.

It will be understood that the discharge material D passes through the conduit passage 20 under considerable pressure and that the air present passes through the filters to be described and out into the atmosphere as cleaned air.

Operatively connected with and to said header conduit 19 are shown dust collection and filter members 25, 26, 27 and 28. The member 26 will be described in detail as representative of the members 25, 27 and 28. Four such members as member 26 are shown for purpose of illustration. Additional such members may be added by a linear or curved extension of said conduit 21 or by transverse extensions thereof.

Figure 4:
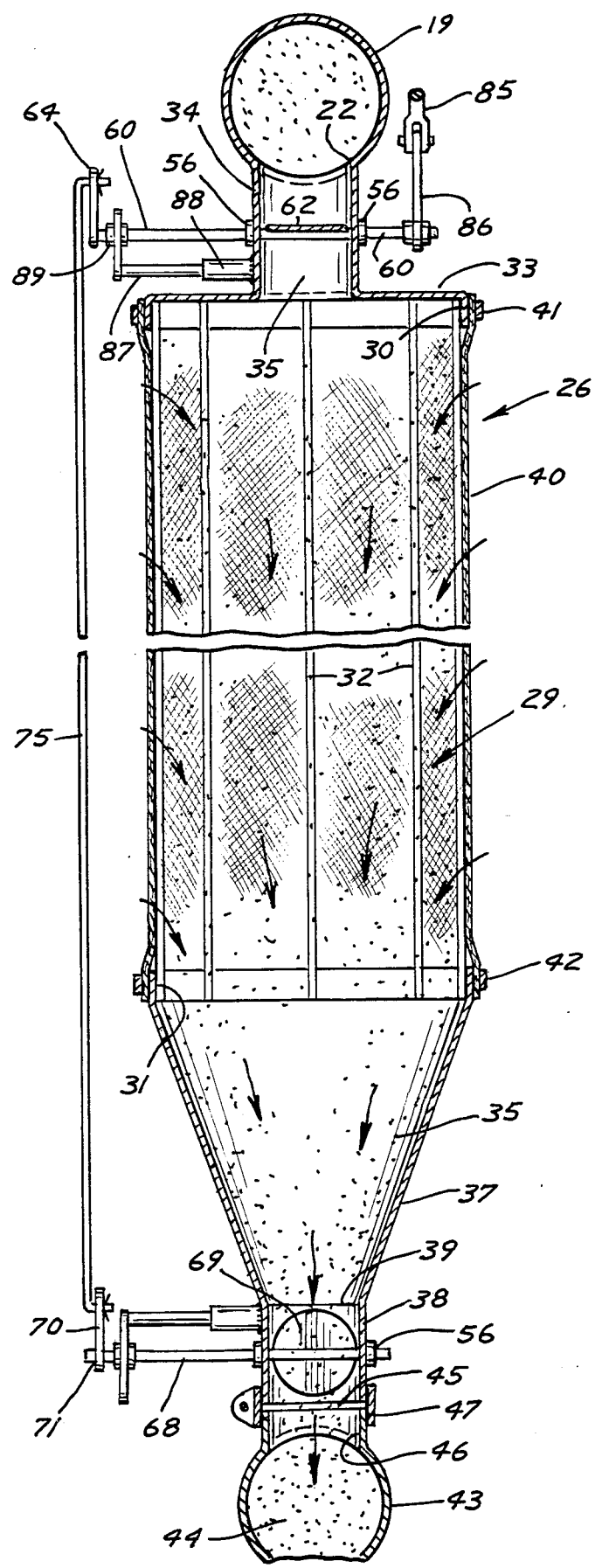
FIG. 4 is a view in vertical section taken on line 4—4 of FIG. 2 as indicated.

Referring now to said member 26 in FIG. 4, a skeletal cage member 29 is formed having an upper ring 30 and a lower ring 31 and having circumferentially spaced rods 32 extending therebetween and secured thereto as by welding.

Said ring 30 has a top wall 33 integral therewith and extending upwardly centrally of said top wall is a sleeve 34 which engages and is secured to said header conduit 19 as by welding, said sleeve having a passage 35 there through and there being an opening 22 in said header conduit for communication therebetween.

Said lower ring 31 is the circular upper vertical wall of the depending collection compartment 35, the same having steeply tapered side walls 37 terminating in a sleeve 38 extending downwardly therefrom.

Disposed over said cage member is a flexible material filter bag 40, the same extending from ring 30 to ring 31 and being secured to said respective rings by split ring clamps 41 and 42 which are known in the art and are not further described.

Underlying said sleeve 38 is an exhaust manifold 43 having a passage 44 therethrough and an upwardly projecting short sleeve 46 closely adjacent said sleeve 38 and the same are clamped in such position by a collar clamp 47 such as having a conventional butterfly securing pin not here shown.

Said manifold 43 extends from a suction blower 50 having an attached electrical motor 51 with lines 52 running to a suitable power source and the same is shown to be supported on a pedestal or motor mount 53. Said blower has what is shown here as an elbow pipe 54 running to and exhausting into said cyclone chamber 13 as at 55 and being secured thereto as by welding. The sleeves 38 and 46 have a space 45 therebetween.

As best shown in FIG. 4, a rod 60 extends through said sleeve 34 being journaled in outboard bearings 56. Said rod carries within said sleeve 34 a closure member 62 such as a butterfly valve or damper plate which when horizontally disposed effectively seals the passage 35 through said neck 34. Secured to the left end of said rod 60 as viewed in FIG. 4 is a crank arm 64.

Extending through said sleeve 38 at the bottom of said member 25 is a rod 68 being journaled in outboard bearings 56 and carrying within said sleeve a butterfly valve or damper plate 69 which when horizontally disposed seals or blocks the passage 39 within said sleeve 38. Said rod 68 has secured to the outer end portion thereof a crank arm 70 which will be removably held as by a butterfly pin as shown at 71. Connecting said crank arms 67 and 70 is an operating rod 75. Said closure members are positioned to be, relative to each other, 180° apart as positioned on said rods 60 and 68 whereby when the passage through the sleeve 34 is closed, the passage through the sleeve 38 is open.

Thus said members 25–28 are equipped alike. When the upper closure member or member 25 is open, its lower closure member shall be closed. In a timed sequence of operation, the upper closure members or valves of each of said members 25–28 will open upon the preceding one in the sequence closing and the lower closure members will operate in like manner with the lower closure members being 180° apart from their respective upper closure members.

A conventional servo motor is bracket mounted at the rear of said header conduit 19 to each of said members 25–28 as shown with said servo motors 80–83 being mounted on the upper portion of each of said members as at 33 in connection with member 26.

The servo motor 80 has an operating member or piston 85 thereof pivoted to a link 86 serving as a crank for the rod 60, being rigidly secured thereto and moving the same through a 90° arm motion.

Supporting the portion of said rod 60 extending outwardly to the crank 64 is a right angled bracket 87 having a base portion 88 welded to said sleeve 34 and having a bearing 89 through which said rod 60 extends.

In operative association with said servo motors 80–83 which are electrically driven is a conventional timing mechanism or timer 90 shown schematically and showing by way of illustration a face or dial 91 having hands 92 and having timing intervals with quarter hours being indicated at 93–96. For illustration here the contacts 93–96 are shown in circuit with the motors 80–83 by means of lines 97–100. Thus said timer sequentially energizes said motors, such as at 15 minute intervals or other suitable settings. Power lines 101 run to a suitable power source 102 to energize the timing mechanism.

The parts of said members 25, 27 and 28 which correspond to like parts of the member 26 are indicated by like reference numerals with a suffix letter added. The corresponding parts of the element 25 will have the suffix letter a added, the parts of the member 27 will have the suffix letter b added and the parts of the member 28 will have the suffix letter c added.

OPERATION

The apparatus herein is to be used with particulate material processing apparatus as indicated here by way of example as being used with a conventional grinding mill which exhausts particle or dust laden air, the same to be filtered to have cleaned air discharged to the atmosphere.

The dust laden air enters the apparatus herein through the conduit D and is thrust into the cyclone member 14 with considerable centrifugal force. The heavier particles in the air drop to the bottom and are discharged as into a receptacle as shown at 24.

The lighter particles are air borne through the blower 16 and out through the header conduit 19 to distribute to the dust filter and collection members 25–28.

As described, each of the members 25–28 has an inlet valve at its upper end and an outlet valve at its lower end.

The valves are arranged such that, for example, when inlet valve 62 of the member 26 is in open position, the outlet valve 69 thereof is in closed position.

The timer 90 will be arranged to actuate said servo motors 80–83 in predetermined sequential intervals whereby only one inlet valve of one of said members 25–28 is closed at any given time and only the corresponding inlet valve is open. Thus the corresponding inlet and outlet valves will of each of the members 25–28 be actuated in a timed sequence and the motion line 43 will evacuate only one of said members at a time.

The collection chambers such as 37 each have steeply sloped side walls whereby the collected particulate material therein readily migrates to and settles at the bottom of said chambers.

Thus at each evacuating interval, with the outlet valve open, the suction of the line 43 very effectively removes the collected material in each collection chamber and removes from the inner wall or surface of the respective filter bags all of the particles clinging thereto. The frames of each of the bags prevent the collapse of the bags with the application of suction thereto.

The servo motors 80–83 by the rotation of the rods 60, 60a, 60b and 60c cause the reciprocal movement of the operating rods 75, 75a, 75b and 75c to operate the corresponding outlet valves.

Thus the evacuation of collected particulate material entering through the inlet valves is effectively achieved.

The change of a filter bag, not here illustrated, is readily accomplished.

With reference to the member 26 in FIG. 4, the collar clamp 47 will be removed which will separate the sleeves 38 and 46. The pin 71 will be withdrawn for the removal of the crank 70 from the rod 68. Next, the clamps 41 and 42 will be removed and the filter bag 40 will be pulled down over the chamber 37 and the sleeve 38 and over the free end of the rod 68 and through the space 45 opened up between the sleeves 38 and 96. Thus the exchange of filter bags is a fairly simple operation.

A salient feature of the apparatus herein is the automatic rotation of the cleaning out of the members 25-28 at whatever timed intervals are desired. The full effect of suction line 43 separately evacuates said members. In FIG. 4 the member 26 is being evacuated and the deflation of the filter bag will be noted. The other members 25, 27 and 28 are receiving incoming streams of dust laden air as noted by the expansion of the filter bags.

It will of course be understood that various changes may be made in form, details, arrangement and proportions of the parts without departing from the scope of the invention herein, which, generally stated, consists in an apparatus capable of carrying out the objects above set forth, in the parts and combinations of parts disclosed and defined in the appended claims.

What is claimed is:

1. A filter and dust collection apparatus having in combination,
    a housing having ends, a chamber therein, and inlet and outlet sleeves in connection with said ends of said housing,
    a filter bag overlying the upper portion of said housing passing cleaned air therethrough,
    a lower portion of said chamber forming a dust collection portion of said chamber,
    an inlet valve member in said inlet sleeve for admitting dust laden air therein,
    a conduit passing dust laden air into said inlet sleeve member,
    an outlet valve member in said outlet sleeve for discharging from said dust collection portion of said chamber,
    an exhaust manifold in connection with said outlet sleeve,
    means exhausting said manifold,
    an operating rod directly connecting said inlet and outlet valves positioning the same in opposed operating positions,
    a servo motor in operating connection with said operating rod, and
    timing means operating said servo motor to operate said rod to open and close said valves at pre-set intervals.
2. The structure of claim 1, including
    a plurality of housings in operative association.
3. The structure of claim 1, wherein
    said inlet and outlet valve members are respectively disposed such that when one is open the other is closed.
4. The structure of claim 1, including
    a plurality of housings in operative relationship,
    said conduit and said manifold being in operative relationship with each of said housings.

* * * * *